(12) United States Patent
Zhang et al.

(10) Patent No.: US 12,555,778 B2
(45) Date of Patent: Feb. 17, 2026

(54) NEGATIVE ELECTRODE PLATE AND LITHIUM-ION BATTERY

(71) Applicant: ZHUHAI COSMX BATTERY CO., LTD., Zhuhai (CN)

(72) Inventors: Shuanghu Zhang, Zhuhai (CN); Ning Peng, Zhuhai (CN); Bin Xie, Zhuhai (CN)

(73) Assignee: ZHUHAI COSMX BATTERY CO., LTD., Zhuhai (CN)

(*) Notice: Subject to any disclaimer, the term of this patent is extended or adjusted under 35 U.S.C. 154(b) by 586 days.

(21) Appl. No.: 18/146,577

(22) Filed: Dec. 27, 2022

(65) Prior Publication Data

US 2023/0135612 A1 May 4, 2023

Related U.S. Application Data

(63) Continuation of application No. PCT/CN2021/130042, filed on Nov. 11, 2021.

(30) Foreign Application Priority Data

Nov. 16, 2020 (CN) .................. 202011280978.X

(51) Int. Cl.
- H01M 4/36 (2006.01)
- H01M 4/02 (2006.01)
- H01M 4/134 (2010.01)
- H01M 4/52 (2010.01)
- H01M 4/62 (2006.01)
- H01M 10/0525 (2010.01)

(52) U.S. Cl.
CPC ........... *H01M 4/366* (2013.01); *H01M 4/134* (2013.01); *H01M 4/52* (2013.01); *H01M 4/623* (2013.01); H01M 2004/027 (2013.01); H01M 10/0525 (2013.01)

(58) Field of Classification Search
None
See application file for complete search history.

(56) References Cited

U.S. PATENT DOCUMENTS

| | | | |
|---|---|---|---|
| 2003/0082374 A1* | 5/2003 | Frisk | D06M 11/32 428/364 |
| 2005/0064292 A1* | 3/2005 | Phillips | H01M 10/44 429/246 |
| 2008/0241566 A1* | 10/2008 | Hoefflin | C08L 1/02 524/53 |
| 2011/0159370 A1 | 6/2011 | Inaba et al. | |
| 2015/0030906 A1* | 1/2015 | Amin-Sanayei | H01M 50/431 429/144 |
| 2016/0380307 A1 | 12/2016 | Akita et al. | |
| 2018/0331342 A1 | 11/2018 | Honda et al. | |
| 2019/0088987 A1 | 3/2019 | Herle et al. | |

FOREIGN PATENT DOCUMENTS

| | | |
|---|---|---|
| CN | 202363549 U | 8/2012 |
| CN | 103378345 A | 10/2013 |
| CN | 205159383 U | 4/2016 |
| CN | 105830250 A | 8/2016 |
| CN | 109686912 A | 4/2019 |
| CN | 208806302 U | 4/2019 |
| CN | 109755557 A | 5/2019 |
| CN | 109888164 A | 6/2019 |
| CN | 110419128 A | 11/2019 |
| CN | 111247671 A | 6/2020 |
| CN | 111326711 A | 6/2020 |
| CN | 112397685 A | 2/2021 |
| JP | H1040918 A | 2/1998 |
| JP | 2003151535 A * | 5/2003 |
| JP | 2007242590 A | 9/2007 |
| JP | 2009134915 A | 6/2009 |
| JP | 2009164014 A | 7/2009 |
| JP | 2010160982 A | 7/2010 |
| JP | 2010160984 A | 7/2010 |
| JP | 2010282849 A | 12/2010 |
| JP | 2013114882 A | 6/2013 |
| JP | 2015115166 A | 6/2015 |
| JP | 2020534651 A | 11/2020 |

(Continued)

OTHER PUBLICATIONS

Machine translation of JP2010-160984A, published on Jul. 22, 2010 (Year: 2010).*

(Continued)

Primary Examiner — Anca Eoff
(74) Attorney, Agent, or Firm — Westbridge IP LLC

(57) ABSTRACT

Disclosed are a negative electrode plate and use thereof. For the negative electrode plate provided in the present disclosure, a negative electrode active layer is coated with a safety function layer containing metal and ceramic, which effectively improve an electrode potential of a negative electrode and a nucleation energy barrier of metal lithium of a lithium-ion battery in a charging process at a low temperature and a high rate, thereby avoiding occurrence of a lithium precipitation phenomenon at the negative electrode. Because of good heat insulation performance of the ceramic, occurrence of a thermal runaway phenomenon in a nail penetration test may be effectively avoided, and safety performance of the battery may be improved. When the negative electrode plate is applied to the lithium-ion battery, the obtained lithium-ion battery has advantages of good cycling performance and high security.

18 Claims, 2 Drawing Sheets

(56) References Cited

FOREIGN PATENT DOCUMENTS

| KR | 20160085293 A | 7/2016 |
|----|---------------|--------|
| KR | 20200034344 A | 3/2020 |
| WO | 2010050507 A1 | 5/2010 |
| WO | 2016163114 A1 | 10/2016 |

OTHER PUBLICATIONS

Machine translation of CN103378345 A, published on Oct. 30, 2013 (Year: 2013).*
Machine translation of JP2003-151535A, published on May 23, 2003 (Year: 2003).*
Carbon black, available online at https://en.wikipedia.org/wiki/Carbon_black, date unknown.*
International Search Report and Written Opinion issued in corresponding PCT Application No. PCT/CN2021/130042, dated Jan. 26, 2022.
Lian, Electrochemical energy storage devices and key materials, 2019, pp. 21-22, Metallurgical Industry Press, Beijing, dated Jul. 31, 2019.
Extended European Search Report issued in counterpart European Patent Application No. 21891181.6, dated Dec. 20, 2024.
Request for the Submission of an Opinion issued in counterpart Korean Patent Application No. KR 10-2023-7004964, dated Dec. 10, 2024.

* cited by examiner

NEGATIVE ELECTRODE PLATE AND LITHIUM-ION BATTERY

CROSS-REFERENCE TO RELATED APPLICATIONS

This application is a continuation of International Application No. PCT/CN2021/130042, filed on Nov. 11, 2021, which claims priority to Chinese Patent Application No. 202011280978.X, filed on Nov. 16, 2020. The disclosures of the aforementioned applications are hereby incorporated by reference in their entireties.

TECHNICAL FIELD

The present disclosure relates to the field of lithium-ion batteries, and relates to a negative electrode plate and a lithium-ion battery.

BACKGROUND

Lithium-ion batteries are ideal electrochemical energy storage apparatuses that are widely used in the field of consumer electronics and electric vehicles due to their advantages such as high energy density, long cycle life, and long standby time. With the popularity of the electric vehicles, the lithium-ion batteries when being charged at a low temperature and a high rate face a severe safety challenge.

Electrical performance of the lithium-ion batteries is greatly affected by dynamics performance. Specifically, desolvation needs to be performed when lithium ions are intercalated into a graphite material, and in this process, diffusion of the lithium ions into the graphite material is hindered due to some energy consumption. On the contrary, when the lithium ions are deintercalated from the graphite material, the lithium ions can be rapidly deintercalated from the graphite material because desolvation does not need to be performed. Therefore, the graphite material is obviously better in discharge acceptance performance than charge acceptance performance.

Dynamics performance of the graphite material further deteriorates during charging at a low temperature and a high rate. For example, viscosity of an electrolyte increases, and a transfer rate of the lithium ions decreases. In this case, the lithium ions do not have enough motive power to be intercalated into the graphite material. Therefore, in a charging process, electrochemical polarization of a negative electrode is aggravated obviously, resulting in convergence of a large quantity of lithium ions at a surface of the negative electrode. The negative electrode reaches a lithium precipitation potential, thereby causing lithium precipitation.

Once metal lithium precipitates at the surface of the negative electrode, lithium stripping occurs in a subsequent discharging process. Part of lithium may continue to be in electrochemical contact with the graphite material, part of lithium becomes isolated lithium, and part of lithium is in an electrochemical reaction with the electrolyte, resulting in a loss of active lithium. What's worse, the lithium precipitation accelerates polarization of the lithium-ion batteries, increases internal resistance, speeds up capacity attenuation, and shortens the cycle life. In addition, if a large quantity of lithium is deposited at the surface of the negative electrode to form a lithium dendrite, the lithium dendrite may easily penetrate a separator, and cause a short circuit between a positive electrode and the negative electrode, resulting in an explosion due to thermal runaway.

Therefore, how to suppress a lithium precipitation phenomenon at a negative electrode of a lithium-ion battery when being charged at a low temperature and a high rate is a problem urgently to be resolved in the field.

SUMMARY

The present disclosure provides a negative electrode plate. In the negative electrode plate, a safety function layer containing metal and ceramic is disposed on a negative electrode active layer, which effectively improves an electrode potential of a negative electrode and a nucleation energy barrier of metal lithium of a lithium-ion battery in a charging process at a low temperature and a high rate, thereby avoiding occurrence of a lithium precipitation phenomenon at the negative electrode. Because of good heat insulation performance of the ceramic, occurrence of a thermal runaway phenomenon in a nail penetration test may be effectively avoided, and safety performance of the battery may be improved.

The present disclosure further provides a lithium-ion battery, including the foregoing negative electrode plate. For the battery, occurrence of lithium precipitation at a negative electrode and occurrence of a thermal runaway phenomenon in a nail penetration test are avoided. Therefore, the lithium-ion battery has advantages of good cycling performance and good safety performance.

A first aspect of the present disclosure provides a negative electrode plate. The negative electrode plate includes a current collector, a negative electrode active layer disposed on at least one function surface of the current collector, and a safety function layer disposed on a surface, away from the current collector, of the negative electrode active layer. The safety function layer includes metal and ceramic.

The foregoing negative electrode plate includes the current collector, the negative electrode active layer, and the safety function layer.

The current collector includes two function surfaces (the two function surfaces of the current collector indicate two surfaces with the largest area of the current collector that are used for coating of a function layer). The negative electrode active layer may be disposed on only one of the two function surfaces, or may be disposed on both the two function surfaces. Alternatively, the negative electrode active layer may be disposed in an entire region of any function surface of the current collector, or may be disposed in only part of a region of any function surface of the current collector.

The negative electrode active layer also includes two function surfaces (the two function surfaces of the negative electrode active layer indicate two surfaces with the largest area of the negative electrode active layer that are used for coating of a function layer). One function surface is connected to the function surface of the current collector, and the other function surface is away from the current collector. The safety function layer is disposed on the function surface, away from the current collector, of the negative electrode active layer. Correspondingly, the safety function layer may be disposed in an entire region of the function surface, away from the current collector, of the negative electrode active layer, or may be disposed in only part of a region of the function surface, away from the current collector, of the negative electrode active layer.

The foregoing safety function layer includes metal and ceramic.

A second aspect of the present disclosure provides a lithium-ion battery. A negative electrode plate of the lithium-ion battery is the negative electrode plate provided in the first aspect of the present disclosure. In addition to the negative electrode plate, the lithium-ion battery further includes a positive electrode plate, a separator, and an electrolyte. Sources of the positive electrode plate, the separator, and the electrolyte are not specifically limited. Conventional materials in the art may be used. Details are not specifically described herein.

Implementations of the present disclosure have at least the following advantages:

1. For the negative electrode plate provided in the present disclosure, on the one hand, the metal content in the safety function layer is adjusted and controlled, so that the electrode potential at the surface of the negative electrode of the battery may be effectively improved in the charging process at a low temperature and a high rate, and the negative electrode may be prevented from reaching the precipitation potential of lithium. On the other hand, addition of the metal to the safety function layer may improve the nucleation energy barrier of lithium. In consideration of both factors in the two aspects, occurrence of the lithium precipitation phenomenon at the negative electrode may be suppressed.

2. Thanks to the ceramic in the safety function layer of the negative electrode plate provided in the present disclosure, enough capillary pores may be provided for the negative electrode plate, and electrolyte wetting may be quickly and sufficiently implemented, thereby improving dynamics performance of the negative electrode and help suppress lithium precipitation. In addition, because of good heat insulation performance of the ceramic, occurrence of a thermal runaway phenomenon in a nail penetration test may be effectively avoided, and safety performance of the battery may be improved.

3. Since the lithium precipitation phenomenon at the negative electrode of the battery is effectively suppressed in the lithium-ion battery provided in the present disclosure, the lithium-ion battery has advantages of good cycling performance and safety performance.

DETAILED DESCRIPTION OF THE EMBODIMENTS

Figure 1:
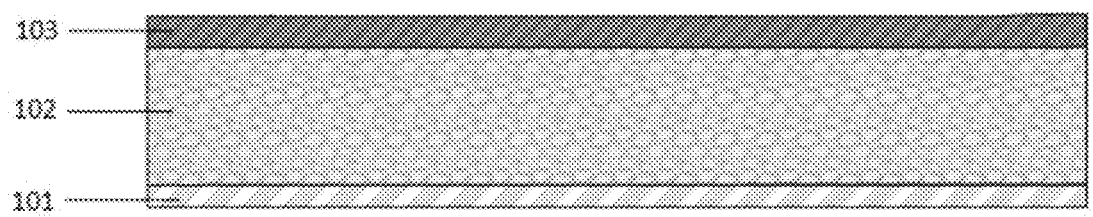
FIG. 1 is a schematic diagram of a negative electrode plate according to an implementation of the present disclosure.

FIG. 1 is a schematic diagram of a negative electrode plate according to an implementation of the present disclosure. As shown in FIG. 1, the negative electrode plate in this implementation includes a current collector 101, a negative electrode active layer 102 disposed on one function surface of the current collector 101, and a safety function layer 103 disposed on a function surface, away from the current collector 101, of the negative electrode active layer 102. The negative electrode active layer is disposed in an entire region of a function surface of the current collector 101. The safety function layer 103 is also disposed in an entire region of the function surface, away from the current collector 101, of the negative electrode active layer 102.

Figure 2:
FIG. 2 is a schematic diagram of a negative electrode plate according to another implementation of the present disclosure.

FIG. 2 is a schematic diagram of a negative electrode plate according to another implementation of the present disclosure. As shown in FIG. 2, the negative electrode plate in this implementation includes a current collector 101, a negative electrode active layer 102 disposed on one function surface of the current collector 101, and a safety function layer 103 disposed on a function surface, away from the current collector 101, of the negative electrode active layer 102. The negative electrode active layer 102 is disposed in part of a region of a function surface of the current collector 101. The safety function layer 103 is also disposed in part of a region of the function surface, away from the current collector 101, of the negative electrode active layer 102.

Figure 3:
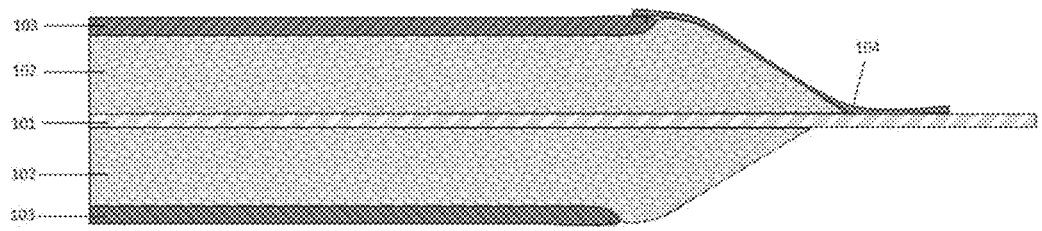
FIG. 3 is a schematic diagram of a negative electrode plate according to still another implementation of the present disclosure.

FIG. 3 is a schematic diagram of a negative electrode plate according to still another implementation of the present disclosure. As shown in FIG. 3, the negative electrode plate in this implementation includes a current collector 101, negative electrode active layers 102 disposed on upper and lower function surfaces of the current collector 101, and safety function layers 103 disposed on function surfaces, away from the current collector 101, of the upper and lower negative electrode active layers 102. The negative electrode active layers 102 are disposed in parts of regions of the upper and lower function surfaces of the current collector 101. The safety function layers 103 are also disposed in parts of regions of the function surfaces, away from the current collector 101, of the upper and lower negative electrode active layers 102.

The safety function layer 103 of the negative electrode plate provided in the present disclosure contains metal and ceramic. Due to existence of the metal, an electrode potential at a surface of a negative electrode in a charging process and a nucleation energy barrier of metal lithium at the surface of the negative electrode may be improved, thereby avoiding occurrence of a lithium precipitation phenomenon at the negative electrode. Because of good heat insulation performance of the ceramic, occurrence of a thermal runaway phenomenon in a nail penetration process may be effectively avoided, and safety performance of the battery may be improved. In addition, thanks to capillary pores on a surface of the ceramic, a wetting rate of an electrolyte may be further enhanced, thereby improving dynamics performance of the negative electrode and promoting transfer of lithium ions to the negative electrode. Improving motive power for the lithium ions to be intercalated into the negative electrode helps suppression on lithium precipitation to some extent.

In the negative electrode plates shown in FIG. 2 and FIG. 3, the negative electrode active layer 102 is disposed in part of a region of the function surface of the current collector 101. The negative electrode active layer 102 includes six surfaces. In addition to two function surfaces with the largest area, the negative electrode active layer 102 further has four side surfaces. One side surface is a surface close to a tab, and an insulation layer 104 is disposed on the surface. One end of the insulation layer 104 extends to the safety function layer 103 and covers part of the safety function layer 103, and the other end of the insulation layer 104 extends to the function surface of the current collector 101. Specifically, a surface of the negative electrode active layer 102 close to the tab may be a curved surface with no safety function layer 103 being disposed. The insulation layer 104 may be an insulation tape. For the negative electrode plate in this implementation, safety of the battery in a winding process may be improved. In addition, because a thick edge effect usually exists in a coating process of the negative electrode active layer 102, a thickness of the negative electrode active layer 102 in an edge region ranges from 3 μm to 8 μm. As a result, an ultra-thick risk exists in a place of the edge region with the largest thickness during winding of a battery cell. The edge region can be flattened through compensation of the safety function layer 103 to the edge region, so that the tape is more closely attached.

In the negative electrode plate of the present disclosure, the metal in the safety function layer 103 generally exists in a form of metal particles. In this case, a surface and an interior of the safety function layer 103 have a pore structure. In an implementation, for example, a particle size of a metal particle may be controlled, composition of a safety function slurry may be controlled, or compacted density used during preparation of the safety function layer 103 may be set, so that a porosity of the safety function layer 103 ranges from 20% to 45%.

In a research process, the inventors found that the porosity of the safety function layer 103 has a significant impact on cycling performance of the lithium-ion battery including the negative electrode plate, because the porosity directly affects wetting performance of the electrolyte for the negative electrode plate. In a case of excessively low porosity, poor wetting performance of the electrolyte for the negative electrode plate is unfavorable for transfer of lithium ions to the negative electrode plate, thereby aggravating a convergence phenomenon of the lithium ions on the surface of the negative electrode and further deteriorating the cycling performance of the battery in a lithium dendrite form. In a case of excessively high porosity, an interface contact area between the safety function layer 103 and the negative electrode active layer 102 decreases. As a result, adhesion force decreases. In a cycling process of the battery, a structure of the safety function layer 103 is damaged due to a stress function of cycle expansion of the negative electrode. In this case, metal particles in the safety function layer 103 are migrated to a positive electrode through a separator, resulting in deterioration of electrical performance.

Although there are many factors affecting the cycling performance of the lithium-ion battery, for example, factors such as different active materials, different binders, different conductive agents, and different electrolytes, the lithium-ion battery may basically have good cycling performance when the porosity of the safety function layer 103 is controlled ranging from 20% to 45%.

An average aperture value of the safety function layer 103 ranges from 10 nm to 500 nm, more preferably from 20 nm to 200 nm, or even more preferably from 20 nm to 100 nm. In addition, a difference between a maximum aperture value and a minimum aperture value is not greater than 80 nm, more preferably not greater than 70 nm, or even more preferably not greater than 50 nm. The apertures at the safety function layer 103 may be controlled, to promote wetting of the electrolyte for the negative electrode plate and facilitate transfer of the lithium ions to the negative electrode.

A thickness of the safety function layer 103 ranges from 0.3 μm to 10 μm, or more preferably from 0.5 μm to 5 μm. A greater thickness of the safety function layer 103 indicates a better safety barrier effect but greater internal resistance of the electrode plate, and leads to an increase in resistance of further intercalating the lithium ions transferred to the safety function layer 103 at the surface of the negative electrode into an active material in the negative electrode active layer 102. In this case, dynamics performance is reduced. On the contrary, an excessively small thickness indicates a small safety barrier effect, and therefore occurrence of a thermal runaway phenomenon in a nail penetration process cannot be effectively avoided.

A coating weight in a coating process may be controlled to control the thickness of the safety function layer 103. For example, in a specific implementation, the coating weight may be controlled ranging from 0.2 mg/cm$^2$ to 0.9 mg/cm$^2$, to ensure that the thickness of the safety function layer 103 falls within a proper range.

The metal in the safety function layer 103 is selected from copper or nickel. Copper or nickel does not participate in an electrochemical reaction of the negative electrode nor an alloying reaction with the metal lithium, and can stably exist at the negative electrode, to effectively exert a function of improving the electrode potential at the surface of the negative electrode and the nucleation energy barrier of the metal lithium at the surface of the negative electrode.

The ceramic in the safety function layer 103 is selected from at least one of aluminium oxide, silicon oxide, magnesium oxide, titanium oxide, hafnium oxide, tin oxide, cerium oxide, nickel oxide, zinc oxide, calcium oxide, zirconium oxide, yttrium oxide, silicon carbide, boehmite, aluminum hydroxide, magnesium hydroxide, calcium hydroxide, barium sulfate, aluminum nitride, boron nitride, barium carbonate, or barium titanate. The foregoing ceramic has good heat insulation performance and enough capillary pores, to avoid occurrence of thermal runaway in a nail penetration test and further promote wetting of the electrolyte for the negative electrode.

Further, a particle size D50 of the metal ranges from 50 nm to 500 nm, and a particle size D50 of the ceramic ranges from 0.5 μm to 5 μm. More preferably, the particle size D50 of the ceramic ranges from 1 μm to 3 μm. It may be understood that a proper particle size of the metal and a proper particle size of the ceramic help form the safety function layer 103 with uniform pores and proper apertures, thereby facilitating electrolyte wetting and ion conduction, and improving the dynamics performance of the negative electrode.

In addition to the metal and the ceramic, the safety function layer 103 in the present disclosure further includes a first binder and a dispersing agent. According to mass percentage, components forming the safety function layer 103 includes the metal ranging from 48% to 60%, the ceramic ranging from 28% to 40%, the first binder ranging from 3% to 8%, and the dispersing agent ranging from 1% to 4%. The mass percentage of the components in the safety function layer 103 may be adjusted to control the electrode potential at the surface of the negative electrode in the charging process, so as to prevent the negative electrode from reaching a deposition potential of the metal lithium.

Sources of the foregoing first binder and dispersing agent are not specifically limited. Conventional materials in the art may be used. The first binder may be a water-based binder or may be an oil-based binder, and may be specifically selected from one or a combination of polyvinylidene fluoride (PVDF), poly(vinylidene fluoride-co-hexafluoropropylene), polyamide, polyacrylonitrile, polyacrylate, polyacrylic acid, polyacrylic acid (salt), polyvinylpyrrolidone, polyvinyl ether, poly(methyl methacrylate), polytetrafluoroethylene, and polyhexafluoropropylene. The dispersing agent may be selected from one or a combination of carboxymethyl cellulose sodium (CMC), carboxymethyl cellulose lithium, polyvinylpyrrolidone (PVP), and poly(vinyl alcohol).

Preparation of the foregoing safety function layer 103 may be obtained through a process including the following process of preparing safety function slurry: (1) Mixing the metal, the first binder, and the dispersing agent, then adding a part of a solvent, and performing stirring to obtain first slurry. (2) Adding the remaining solvent to the first slurry, and performing stirring to obtain second slurry. (3) Adding the ceramic to the second slurry, and performing stirring to obtain the safety function slurry.

In Step (1), because only a part of the total solvent is added during preparation of the first slurry, it may be ensured that the first slurry has relatively high viscosity. Specifically, a viscosity range of the first slurry may be controlled ranging from 30000 mPa·s to 100000 mPa·s through controlling an added solvent amount. In a highly viscous state, the stirring process can effectively dissolve and mix particles, to evenly disperse the particles.

Figure 4:
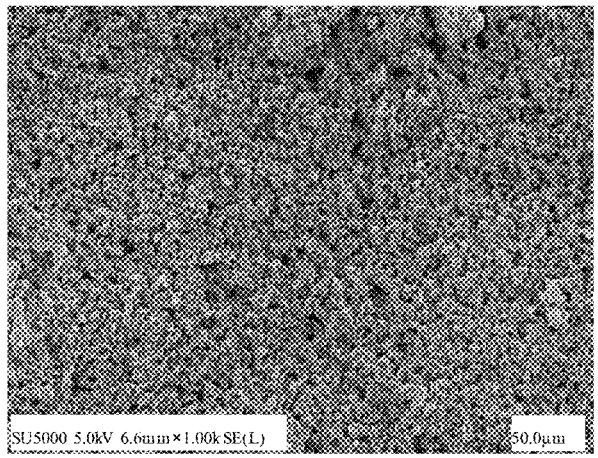
FIG. 4 is a scanning electron microscope image of a second slurry.

In Step (2), the remaining solvent is added to the first slurry, and stirring is performed to obtain the second slurry. FIG. 4 is a scanning electron microscope image of the second slurry. It can be learned from the image that the metal is evenly dispersed in a particle form.

Figure 5:
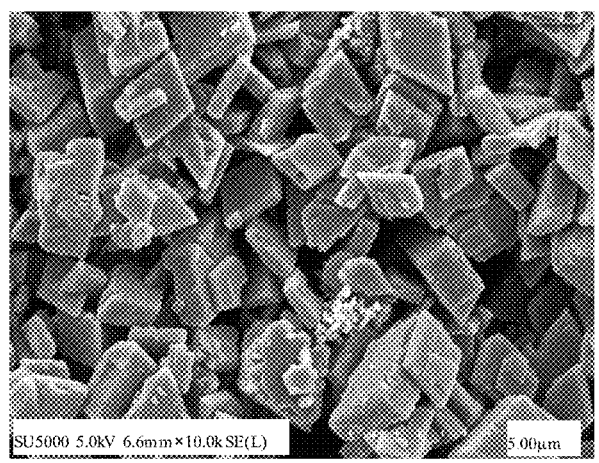
FIG. 5 is a scanning electron microscope image of a safety function slurry.

In Step (3), the ceramic is added to the second slurry, and stirring is performed to make metal particles be evenly distributed on a surface and a gap of the ceramic, thereby obtaining a compact flat safety function layer 103 with uniform pores. FIG. 5 is a scanning electron microscope image of the safety function slurry. It can be learned from the image that the metal particles are evenly distributed on the surface and the gap of the ceramic.

The solvent used in the foregoing process of preparing the safety function slurry is selected from one of deionized water, ethanol, or N-Methyl-2-pyrrolidone (NMP).

A content of each component, an amount of the solvent, a type of the solvent and the like may be adjusted in the foregoing preparation process, to control a solid content of the safety function slurry ranging from 10% to 50%, more preferably from 14% to 35%. The viscosity of the safety function slurry ranges from 50 mPa·s to 1500 mPa·s, more preferably from 50 mPa·s to 500 mPa·s. A pH value of the safety function slurry ranges from 3 to 10, more preferably from 5 to 9.

After the safety function slurry is obtained, the preparation of the safety function layer 103 further includes: coating the negative electrode active layer 102 with the safety function slurry, and performing drying to obtain the safety function layer 103. Herein, a drying temperature ranges from 80° C. to 125° C.

The current collector 101 and the negative electrode active layer 102 in the negative electrode plate of the present disclosure are not specifically limited. The current collector 101 may be commonly-used copper foil of a negative electrode current collector. The negative electrode active layer 102 includes a negative electrode active material, a second binder, and a conductive agent. The negative electrode active material may be selected from at least one of synthetic graphite, natural graphite, mixed graphite, and mesocarbon microbeads. The second binder may be selected from at least one of styrene-butadiene rubber (SBR), poly (vinylidene fluoride-co-hexafluoropropylene), polyacrylonitrile, carboxymethyl cellulose sodium, poly(butadiene-co-acrylonitrile), poly(methyl acrylate), poly(ethyl acrylate), poly(acrylic acid-co-styrene), polyvinylidene fluoride, poly (vinyl alcohol), polyurethane, polyacrylate, butyl rubber, epoxy resin, vinyl acetate resin, or chlorinated rubber. The conductive agent may be selected from at least one of conductive carbon black, super conductive carbon black, conductive graphite, acetylene black, graphene, or a carbon nanotube.

To make the objectives, technical solutions, and advantages of this disclosure clearer, the following clearly and completely describes the technical solutions in this disclosure with reference to the embodiments of this disclosure. Apparently, the described embodiments are some but not all of the embodiments of this disclosure. All other embodiments obtained by a person of ordinary skill in the art based on the embodiments of the present disclosure without creative efforts shall fall within the protection scope of the present disclosure.

Example 1

A schematic diagram of a negative electrode plate in this example is shown in FIG. 3. A manner of preparing a negative electrode plate and a lithium-ion battery is as follows:

(1) Preparation of a Negative Electrode Plate

Graphite, conductive carbon black, styrene-butadiene rubber (SBR), and carboxymethyl cellulose sodium (CMC) were added to deionized water according to a mass ratio of 96:1.5:1.5:1, and then are stirred evenly to obtain negative electrode active slurry. Upper and lower function surfaces of copper foil of the negative electrode current collector 101 were evenly coated with the prepared negative electrode active slurry. A width of the electrode plate is 50 mm. A total length of the electrode plate is 942 mm. Part of a region of the upper and lower function surfaces of the copper foil was coated with the negative electrode active slurry. A coating length on the upper function surface is 888 mm, and a coating length on the lower function surface is 776 mm. The negative electrode active slurry for coating the upper and lower function surfaces of the copper foil was aligned at one end. A coating weight is 9.85 mg/cm$^2$. A negative electrode active layer 102 was obtained through preparation after drying and compacting. A compacted density is 1.7 g/cm$^3$.

Nickel with a mass percentage of 48%, polyvinylidene fluoride (PVDF) with a mass percentage of 6%, and polyvinylpyrrolidone (PVP) with a mass percentage of 4% were added to N-methylpyrrolidone (NMP) occupying 30% of a mass of a total solvent, and were stirred evenly to obtain a first slurry with viscosity of 25000 mPa·s. A particle size D50 of nickel is 200 nm. The remaining 70% N-methylpyrrolidone (NMP) solvent was added to the first slurry, and stirred evenly to obtain a second slurry. Boehmite with a mass percentage of 42% was added to the second slurry, and stirred evenly and vacuumized to remove bubbles and obtain a safety function slurry with a solid content of 20%, viscosity of 230 mPa·s, and a pH value of 7.2. A particle size D50 of boehmite is 1 μm. Part of a region of function surfaces of upper and lower negative electrode active layers 102 of the prepared current collector 101 was coated with the safety function slurry. A coating length on the function surface of the upper negative electrode active layer 102 is 887 mm, and a coating length on the function surface of the lower negative electrode active layer 102 is 775 mm. A coating weight is 0.745 mg/cm$^2$. Drying was performed at a temperature of 80° C. Compacting was performed to a compacted density of 1.72 g/cm$^3$, to obtain upper and lower safety function layers 103 with a thickness of 3.6 μm. A porosity of the safety function layer 103 is 30%. An average aperture value is 63 nm. A difference between a maximum aperture value and a minimum aperture value is 50 nm. Part of a region at a rear end on a right side of the upper function surface of the copper foil was reserved to be used for welding a nickel tab. A curved surface part, close to the nickel tab, of the negative electrode active layer 102 located on the upper function surface of the copper foil was not coated with the safety function layer 103. An insulation tape was attached to this part. The insulation tape extended from a left end to the rear end of the safety function layer 103, and covered part of the safety function layer 103; and extended from a right end to the upper function surface of the copper foil. A width of the tape is 16 mm, and a thickness of the tape is 22 μm.

(2) Preparation of a Positive Electrode Plate

Lithium cobalt oxide, conductive carbon black, and polyvinylidene fluoride (PVDF) were added to N-methylpyrrolidone (NMP) according to a mass ratio of 95:3:2, and then were stirred evenly to obtain positive electrode active slurry. A positive electrode current collector aluminum foil was evenly coated with the obtained positive electrode active slurry. The positive electrode plate was obtained after drying and compacting.

(3) Preparation of an Electrolyte

Lithium hexafluorophosphate (LiPF$_6$) at a concentration of 1M was used as lithium salt. A mixture of ethylene carbonate (EC), dimethyl carbonate (DMC), and ethyl methyl carbonate (EMC) was used as a non-aqueous organic solvent (a mass ratio is EC:DMC:EMC=3:4:3). Then, an additive containing 3 wt % fluoroethylene carbonate (FEC) and 1 wt % vinylene carbonate were added. Stirring was evenly performed to obtain the electrolyte.

(4) Assembly of a Lithium-Ion Battery

The prepared negative electrode plate, the positive electrode plate, and a polypropylene micro-porous separator were superposed at once. Then, a cell of the lithium-ion battery was prepared by using a winding process. The cell was packed into a case, and the prepared electrolyte was injected. The assembly of the lithium-ion battery was completed after processes such as sealing, formation, and capacity sorting.

Example 2

A difference between this example and Example 1 is that the safety function layer 103 in the negative electrode plate includes components: nickel with a mass percentage of 55%, boehmite with a mass percentage of 35%, polyvinylidene fluoride (PVDF) with a mass percentage of 6%, and polyvinylpyrrolidone (PVP) with a mass percentage of 4%. The remaining steps are the same as those in Example 1. Details are not described herein again.

Example 3

A difference between this example and Example 1 is that the safety function layer 103 in the negative electrode plate includes components: nickel with a mass percentage of 60%, boehmite with a mass percentage of 30%, polyvinylidene fluoride (PVDF) with a mass percentage of 6%, and polyvinylpyrrolidone (PVP) with a mass percentage of 4%. The remaining steps are the same as those in Example 1. Details are not described herein again.

Example 4

A difference between this example and Example 1 is that the safety function layer 103 in the negative electrode plate includes components: copper with a mass percentage of 48%, boehmite with a mass percentage of 42%, polyvinylidene fluoride (PVDF) with a mass percentage of 6%, and polyvinylpyrrolidone (PVP) with a mass percentage of 4%. The remaining steps are the same as those in Example 1. Details are not described herein again.

Example 5

A difference between this example and Example 1 is that the safety function layer 103 in the negative electrode plate in this example includes components: copper with a mass percentage of 55%, boehmite with a mass percentage of 35%, polyvinylidene fluoride (PVDF) with a mass percentage of 6%, and polyvinylpyrrolidone (PVP) with a mass percentage of 4%. The remaining steps are the same as those in Example 1. Details are not described herein again.

Example 6

A difference between this example and Example 1 is that the safety function layer 103 in the negative electrode plate in this example includes components: copper with a mass percentage of 60%, boehmite with a mass percentage of 30%, polyvinylidene fluoride (PVDF) with a mass percentage of 6%, and polyvinylpyrrolidone (PVP) with a mass percentage of 4%. The remaining steps are the same as those in Example 1. Details are not described herein again.

Example 7

A difference between this example and Example 1 is as follows: after coating of the safety function layer 103 was completed, drying and compacting were performed for the safety function layer 103. A compacted density was set to 1.78 g/cm$^3$, and a porosity of the safety function layer 103 is 18%. The remaining steps are the same as those in Example 1. Details are not described herein again.

Example 8

A difference between this example and Example 1 is as follows: after coating of the safety function layer 103 was completed, drying and compacting were performed for the safety function layer 103. A compacted density was set to 1.85 g/cm$^3$, an average aperture value of the safety function layer 103 is 20 nm, and a difference between a maximum aperture value and a minimum aperture value is 35 nm. The remaining steps are the same as those in Example 1. Details are not described herein again.

Comparative Example 1

A difference between this comparative example and Example 1 is that there is no safety function layer 103 in the negative electrode plate. The remaining steps are the same as those in Example 1. Details are not described herein again.

Test Cases

Test of the following parameters was performed on the negative electrode plate and the lithium-ion battery prepared in Examples 1 to 8 and Comparative Example 1 of the present disclosure. Results are shown in Table 1:

(1) Capacity Retention (25° C., 1 C/1 C, 800 Cycles)

A test method is as follows: At 25° C., the lithium-ion battery was charged to 4.35 V at 1 C in a constant-current charging manner, and then charged to 0.05 C in a constant-voltage charging manner. The lithium-ion battery was left standing for 5 min, and then discharged to 3.0 V at 1 C in a constant-current discharging manner. This was the first cycle. The foregoing process was repeated to test cycling performance of the lithium-ion battery. Capacity retention (%) after 800 cycles of the lithium-ion battery=Discharge capacity after 800 cycles/Discharge capacity after the first cycle×100%.

(2) Status of Lithium Precipitation (0° C., 0.2 C/1 C, 10 Cycles)

A test method is as follows: At 0° C., the lithium-ion battery was charged to 4.35 V at a charge rate of 0.2 C in a constant-current charging manner, and then charged in a constant-voltage charging manner until a current fell to 0.05 C. A discharging process was discharging the lithium-ion battery to 3.0 V at a discharge rate of 1 C in a constant-current discharging manner, this was one charge-discharge cycle. After the lithium-ion battery underwent 10 charge-discharge cycles, a status of lithium precipitation of the battery was observed.

(3) Capacity Retention (10° C., 0.5 C/1 C, 100 Cycles)

A test method is as follows: At 10° C., the lithium-ion battery was charged to 4.35 V at 0.5 C in a constant-current charging manner, and then charged to 0.05 C in a constant-voltage charging manner. The lithium-ion battery was left standing for 5 min, and then discharged to 3.0 V at 1 C in a constant-current discharging manner. This was the first cycle. The foregoing process was repeated to test cycling performance of the lithium-ion battery. Capacity retention (%) after 100 cycles of the lithium-ion battery=Discharge capacity after 100 cycles/Discharge capacity after the first cycle×100%.

(4) Nail Penetration Pass Rate

A test method is as follows: At 25±5° C., the battery was discharged at 0.5 C to 3.0 V, and then left standing for 5 min. The cell was placed in a 25° C. incubator, charged to 4.35 V at 0.5 C in a constant-current manner, and then charged to a cut-off current C in a constant-voltage manner. A voltage and internal resistance before the test were recorded, and an appearance was checked and taken pictures. A nail penetration test was conducted on the lithium-ion battery when a temperature was 25° C., a nail penetration height was 610 mm, a dropping speed of a steel nail was 150 mm/s, a diameter of the steel nail was 2.5 mm, and a length of a nail head part was 6 mm. In a test process, an open circuit voltage (Open Circuit Voltage, OCV for short) and a surface temperature of the cell were monitored in real time. The test was stopped after the test was conducted for 5 minutes or after the surface temperature of the cell dropped to 50° C. After the test ended, the OCV and alternating current impedance obtained after the test were recorded, and the appearance was checked and taken pictures. A criteria of determining is no fire and no explosion. The pass rate is expressed as follows: For example, if 10 cells are tested and five cells pass the test, the nail penetration pass rate is 5/10.

In Table 1, it may be learned from comparison between a status of lithium precipitation in Examples 1 to 8 and that in Comparative Example 1 (0° C., 0.2 C/1 C, 10 cycles) that a lithium-ion battery that includes a safety function layer in a negative electrode plate obviously has a better status of lithium precipitation than a lithium-ion battery that does not include a safety function layer in a negative electrode plate. In addition, it may be learned from data of the capacity retention (25° C., 1 C/1 C, 800 cycles) that a lithium-ion battery that includes a safety function layer in a negative electrode plate has better cycling performance than a lithium-ion battery that does not include a safety function layer in a negative electrode plate during high-rate charging. Further, it may be learned from data of the capacity retention (10° C., 0.5 C/1 C, 100 cycles) that a lithium-ion battery that includes a safety function layer in a negative electrode plate has better cycling performance at a low temperature, but a lithium-ion battery that does not include a safety function layer in a negative electrode plate has poor cycling performance due to a loss of active lithium in the battery because of serious lithium precipitation. Finally, it may be learned from the comparison of the nail penetration pass rates that the nail penetration pass rate of a lithium-ion battery with a safety function layer in a negative electrode plate is obviously better than that of a lithium-ion battery without a safety function layer in a negative electrode plate, and therefore, the battery with a safety function layer has better safety performance.

It may be learned from comparison between data in Examples 1 to 3 and data in Examples 4 to 6 that a safety function layer containing nickel has better performance than a safety function layer containing copper in an effect of suppressing lithium precipitation in a battery, a capacity retention rate of the battery when being charged at a low temperature and a high rate, and a nail penetration pass rate. It may be learned from comparison among data in Examples 1, 2, and 3 that the status of lithium precipitation and cycling performance of the battery when being charged at the low temperature and the high rate may be improved through increasing a content of nickel in the safety function layer.

It may be learned from comparison between Example 7 and Example 1 that, when a porosity of the safety function layer is less than 20%, the lithium-ion battery has a worse status of lithium precipitation at the low temperature, but still has an obvious advantage over the lithium-ion battery at the low temperature in Comparative Example 1 in terms of a status of lithium precipitation. It may be learned from comparison between Example 8 and Example 1 that when the average aperture value is 20 nm, lithium precipitation at the low temperature is alleviated. This indicates that as the

TABLE 1

| Number | Capacity retention (25° C., 1 C/1 C, 800 cycles) | Status of lithium precipitations (0° C., 0.2 C/1 C, 10 cycles) | Capacity retention (10° C., 0.5 C/1 C, 100 cycles) | Nail penetration pass rate |
|---|---|---|---|---|
| Example 1 | 86.2% | Slight lithium precipitation | 97.2% | 8/10 |
| Example 2 | 85.4% | No lithium precipitation | 98.3% | 7/10 |
| Example 3 | 84.9% | No lithium precipitation | 98.6% | 7/10 |
| Example 4 | 82.5% | Slight lithium precipitation | 97.3% | 6/10 |
| Example 5 | 82.7% | Slight lithium precipitation | 96.9% | 5/10 |
| Example 6 | 83.3% | Slight lithium precipitation | 96.5% | 6/10 |
| Example 7 | 83.5% | Slight lithium precipitation | 94.6% | 3/10 |
| Example 8 | 86.5% | No lithium precipitation | 97.4% | 7/10 |
| Comparative Example 1 | 81.2% | Serious lithium precipitation | 90.2% | 0/10 | aperture decreases, a migration path for lithium ions through pores is shortened, electric contact is enhanced, and dynamics performance of the negative electrode is improved.

In conclusion, it should be noted that the above embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing examples or make equivalent replacements to some or all technical features thereof without departing from the scope of the technical solutions of the embodiments of the present disclosure.

What is claimed is:

1. A negative electrode plate, comprising a current collector, a negative electrode active layer disposed on at least one function surface of the current collector, and a safety function layer disposed on a surface, away from the current collector, of the negative electrode active layer; wherein the safety function layer comprises metal and ceramic; and
the average aperture value of the safety function layer ranges from 20 nm to 200 nm, and a difference between a maximum aperture value and a minimum aperture value is not greater than 70 nm.

2. The negative electrode plate according to claim 1, wherein a porosity of the safety function layer ranges from 20% to 45%.

3. The negative electrode plate according to claim 1, wherein the average aperture value of the safety function layer ranges from 20 nm to 100 nm, and a difference between a maximum aperture value and a minimum aperture value is not greater than 50 nm.

4. The negative electrode plate according to claim 1, wherein a thickness of the safety function layer ranges from 0.3 μm to 10 μm.

5. The negative electrode plate according to claim 1, wherein a thickness of the safety function layer ranges from 0.5 μm to 5 μm.

6. The negative electrode plate according to claim 1, wherein the metal is selected from nickel or copper.

7. The negative electrode plate according to claim 1, wherein the ceramic is selected from at least one of aluminum oxide, silicon oxide, magnesium oxide, titanium oxide, hafnium oxide, tin oxide, cerium oxide, nickel oxide, zinc oxide, calcium oxide, zirconium oxide, yttrium oxide, silicon carbide, boehmite, aluminum hydroxide, magnesium hydroxide, calcium hydroxide, barium sulfate, aluminum nitride, boron nitride, barium carbonate, or barium titanate.

8. The negative electrode plate according to claim 1, wherein a particle size D50 of the metal ranges from 50 nm to 500 nm, and/or a particle size D50 of the ceramic ranges from 0.5 μm to 5 μm.

9. The negative electrode plate according to claim 1, wherein a particle size D50 of the ceramic ranges from 1 μm to 3 μm.

10. The negative electrode plate according to claim 1, wherein the safety function layer further comprises a first binder and a dispersing agent.

11. The negative electrode plate according to claim 10, wherein according to mass percentage, the safety function layer comprises the metal ranging from 48% to 60%, the ceramic ranging from 28% to 40%, the first binder ranging from 3% to 8%, and the dispersing agent ranging from 1% to 4%.

12. The negative electrode plate according to claim 11, wherein the first binder is a water-based binder or an oil-based binder.

13. The negative electrode plate according to claim 11, wherein the first binder is selected from one or a combination of polyvinylidene fluoride, poly(vinylidene fluoride-co-hexafluoropropylene), polyamide, polyacrylonitrile, polyacrylate, polyacrylic acid, a salt of polyacrylic acid, polyvinylpyrrolidone, polyvinyl ether, polytetrafluoroethylene, or polyhexafluoropropylene.

14. The negative electrode plate according to claim 11, wherein the dispersing agent is selected from one or a combination of carboxymethyl cellulose sodium, carboxymethyl cellulose lithium, polyvinylpyrrolidone, or poly(vinyl alcohol).

15. The negative electrode plate according to claim 1, wherein an insulation layer is disposed on a surface, close to a tab, of the negative electrode active layer, one end of the insulation layer extends to the safety function layer and covers part of the safety function layer, and the other end of the insulation layer extends to the function surface.

16. The negative electrode plate according to claim 1, wherein the negative electrode active layer comprises a negative electrode active material, a second binder, and a conductive agent.

17. The negative electrode plate according to claim 16, wherein the negative electrode active material is selected from at least one of synthetic graphite, natural graphite, mixed graphite, or mesocarbon microbeads; and/or
the second binder is selected from at least one of styrene-butadiene rubber (SBR), poly(vinylidene fluoride-co-hexafluoropropylene), polyacrylonitrile, carboxymethyl cellulose sodium, poly(butadiene-co-acrylonitrile), poly(acrylic acid-co-styrene), polyvinylidene fluoride, poly(vinyl alcohol), polyurethane, polyacrylate, butyl rubber, epoxy resin, vinyl acetate resin, or chlorinated rubber; and/or
the conductive agent is selected from at least one of conductive carbon black, super conductive carbon black, conductive graphite, graphene, or a carbon nanotube.

18. A lithium-ion battery, wherein the lithium-ion battery comprises the negative electrode plate according to claim 1.

* * * * *